(12) United States Patent
Sugiura et al.

(10) Patent No.: US 7,207,190 B2
(45) Date of Patent: Apr. 24, 2007

(54) EJECTOR

(75) Inventors: Takayuki Sugiura, Anjo (JP);
Hirotsugu Takeuchi, Nagoya (JP);
Hiroshi Oshitani, Toyota (JP); Hiroshi Watanabe, Kariya (JP)

(73) Assignee: DENSO Corporation, Kariya (JP)

( * ) Notice: Subject to any disclaimer, the term of this patent is extended or adjusted under 35 U.S.C. 154(b) by 182 days.

(21) Appl. No.: 11/060,618

(22) Filed: Feb. 17, 2005

(65) Prior Publication Data

US 2005/0188719 A1  Sep. 1, 2005

(30) Foreign Application Priority Data

Feb. 18, 2004  (JP)  ............. 2004-041164

(51) Int. Cl.
*F25B 1/06* (2006.01)

(52) U.S. Cl. ....................................... 62/500

(58) Field of Classification Search .......... 62/116, 62/170, 191, 500, 503, 512, 527, 528; 137/111, 137/114

See application file for complete search history.

(56) References Cited

U.S. PATENT DOCUMENTS 3,724,476 A * 4/1973 Bader ................. 137/842
6,729,158 B2 * 5/2004 Sakai et al. ............. 62/500
6,779,360 B2 * 8/2004 Kawamura et al. ......... 62/500
6,966,199 B2 * 11/2005 Takeuchi ................. 62/500
7,062,929 B2 * 6/2006 Nishida et al. ............ 62/170

FOREIGN PATENT DOCUMENTS

| JP | 4-276200 A | * 10/1992 |
|----|------------|-----------|
| JP | 5-312421   | 11/1993   |
| JP | 2003-185275 | 7/2003   |

* cited by examiner

*Primary Examiner*—Mohammad M. Ali
(74) *Attorney, Agent, or Firm*—Harness, Dickey & Pierce, PLC

(57) ABSTRACT

An ejector including a nozzle 17 having a high pressure space 18 into which a high pressure coolant flows from an inlet 17a and a throttle portion 17c for reducing a passage area of the high pressure coolant from the high pressure space 18 to jet port 17b, a needle valve 19 for changing opening of the throttle portion 17c by undergoing displacement in an axial direction R of the throttle portion 17c, and a suction space 22 in which a jet port 17b and a gaseous phase coolant inlet 22a are arranged, wherein an end portion 19c of the needle valve 19 on the side opposite to the jet port is arranged on an opposite side end portion space 21 as a space different from the high pressure space 18 and is communicated with the suction space 22.

15 Claims, 4 Drawing Sheets

EJECTOR

BACKGROUND OF THE INVENTION

1. Field of the Invention

This invention relates to an ejector (refer to JIS (Japanese Industry Standard) Z 8126, No. 2.1.2.3.) that is pressure reducing means, for reducing a pressure of a fluid, and a momentum transportation type pump for transporting the fluid by entrainment with an operation fluid jetted at a high speed. The ejector is effective when applied to a refrigerator, an air conditioner, etc, employing the ejector as pressure reducing means for reducing a pressure of a coolant and as pump means for circulating the coolant.

2. Description of the Related Art

Japanese Unexamined Patent Publication No. 2003-185275 describes an ejector that is used as coolant pressure reducing means and as coolant circulating means and regulates a flow rate of the coolant passing through the ejector.

In the ejector 50 of this prior art example shown in FIG. 4, the coolant pressurized to a high pressure by a compressor flows into a high pressure space 18 through an inlet 51. As a throttle portion 17c of a nozzle 17 contracts a passage area, pressure energy of the high pressure coolant is converted to velocity energy. The coolant is thus accelerated and is jetted from a jet port 17b. A gaseous phase coolant evaporated in an evaporator is sucked from a gaseous phase coolant inlet 22a by entrainment with the flow of the jetted coolant having a high speed.

The coolant further passes through a mixing portion 23 and flows into a diffuser portion 24. The ejector converts expansion energy of the coolant to pressure energy in this diffuser portion 24, elevates the pressure of the coolant on the suction side of the compressor and reduces power consumption of the compressor on the downstream side of the flow of the coolant. After passing through the diffuser portion 24, the coolant is separated by a gas-liquid separator into a liquid phase coolant and a gaseous phase coolant. The gaseous phase coolant is sucked into the compressor and the liquid phase coolant evaporates in the evaporator, changes to the gaseous phase coolant and reaches the gaseous phase coolant inlet 22a.

In the prior art example, the needle valve 19 is caused to undergo displacement in an axial direction R (in a transverse direction in FIG. 3) of the nozzle by displacement means 52 to change the opening of the throttle portion 17c, that is, the opening of the nozzle 17 (flow passage area through which the coolant can flow) and can thus increase or decrease the flow rate of the coolant passing through the nozzle 17. In this prior art example, when the needle valve 19 undergoes displacement in a jet port direction R1 (to the right in FIG. 3), the opening of the nozzle 17 is decreased and when the needle valve 19 undergoes displacement in a direction R2 opposite to the jet port (to the right in FIG. 3), the opening of the nozzle 17 is increased.

This ejector 50 can increase the opening of the nozzle 17 when the compressor turns at a high speed, that is, when the amount of the coolant flowing into the ejector 50 is great, and can increase the amount of the coolant flowing through the nozzle 17 (ejector 50). Because the amount of the coolant flowing through the evaporator downstream of the ejector 50 in the coolant flowing direction thus increases, the refrigeration (cooling) capacity can be improved particularly when the amount of the coolant flowing through the cycle is large in comparison with the case where the flow rate of the coolant passing through the ejector 50 cannot be increased or decreased.

The inventors of the present invention have examined an ejector 53 of a comparative example using a solenoid 20 shown in FIG. 4 as a general method of causing displacement of the needle valve 19. This comparative example includes a partition 54 so arranged as to slidably support the needle valve 19 in the axial direction R of the nozzle. Because the partition 54 is disposed at a position that separates a high pressure space 18 from an opposite side end portion space 21 at which an end portion 19c of the needle valve 19 opposite to the jet port is positioned, a communication passage 54a communicates both spaces 18 and 21 with each other so that the pressures inside both spaces 18 and 21 are substantially the same. Consequently, the needle valve 19 is concretely allowed to undergo displacement in the axial direction R of the nozzle.

In the needle valve 19 of the ejector of the comparative example, however, the pressure difference between the opposite side end portion 19c opposite to the jet port (high pressure) and the jet port side end portion 19b (low pressure) is large in the needle valve 19. Therefore, the needle valve 19 receives force (drag) in the jet port direction R1 (to the right in FIG. 4) and large force is necessary for the displacement of the needle valve 19. Consequently, problems occur in that the solenoid 20 becomes large and delicate displacement in the axial direction R of the nozzle is difficult particularly when the flow rate is small.

SUMMARY OF THE INVENTION

In view of the problems described above, the invention is directed to reduce force necessary for the displacement of the needle valve in the ejector that regulates the flow rate of the fluid by the displacement of the needle valve.

To accomplish this object, the present invention provides an ejector comprising throttle means (17) having a high pressure space (18) into which a high pressure fluid flows from an inlet (17a); a throttle means (17) having a throttle portion (17c) for reducing a passage area of the high pressure fluid from the high pressure space (18) towards a fluid jet port (17b); a needle valve (19) for changing opening of the throttle portion (17c) by undergoing displacement in an axial direction (R) of the throttle portion (17c); and a suction space (22) having a second inlet (22a) into which a fluid flows and the jet port (17b) arranged therein, and sucking the fluid from the second inlet (22a) by an entrainment operation of an operation fluid jetted at a high speed from the fluid jet port (17b); wherein a space at which an end portion (19b) of the needle valve (19) on the side of the jet port and a space at which an end potion (19c) of the needle valve (19) on the opposite side to the jet port communicate with each other.

Because the space in which the end portion (19b) of the needle valve (19) on the jet port side is positioned and the space in which the end portion (19c) on the opposite side to the jet port communicate with each other in the ejector described above, the pressure difference between both end portions (19b and 19c) is small. Therefore, the drag acting on the needle valve (19) due to the pressure difference becomes smaller than in the comparative example shown in FIG. 4 in which the pressure of either end portion (19b and 19c) is great, and the needle valve (19) can be allowed to undergo displacement with a smaller force.

Therefore, it is possible to prevent the displacement means for creating displacement force from becoming large. It is also possible to conduct delicate displacement adjustment of the needle valve (19) particularly when the flow rate passing through the throttle portion (17c) is small.

In the present invention, the end portion (19c) of the needle valve (19) on the opposite side to the jet port is arranged in an opposite side end portion space (21) as a different space from the high pressure space (18), and the opposite side end potion space (21) communicates with the suction space (22).

Incidentally, it is the high pressure space (18) into which the high pressure fluid flows that the fluid has the highest pressure inside the ejector. On the other hand, the fluid has the lowest pressure immediately after it is jetted from the fluid jet port (17b), that is, inside the suction space (22). In other words, the pressure difference between both end portions (19b and 19c) becomes a maximum when either one of the end portion (19b) of the needle valve (19) on the fluid jet port side and the end portion (19c) on the side opposite to the jet port is positioned in the high pressure space (18) with the other end portion being positioned in the suction space (22).

Generally, the jet port side end portion (19b) of the needle valve (19) is positioned in many cases in the proximity of the fluid jet port (17b) or at a position on the fluid flow downstream side, that is, in the suction space (22). Therefore, when the side end portion (19c) of the needle valve (19) opposite to the fluid jet port is positioned in the high pressure space (18), the pressure difference between both ends (19b and 19c) of the needle valve becomes a maximum.

In the present invention, the end portion (19c) of the needle valve (19) on the opposite side to the jet port is arranged in an opposite side end portion space (21) as a different space from the high pressure space (18), and the opposite side end portion space (21) and the suction space (22) communicate with each other.

Accordingly, the pressures of both end portions (19b and 19c) of the needle valve (19) are made substantially equal to each other, the pressure difference between both end portions (19b and 19c) can be reduced and the effect described above can be concretely exhibited.

In the present invention, the end portion (19c) of the needle valve (19) on the opposite side to the jet port is arranged in an opposite side end portion space (21) as a space different from the high pressure space (18), a mixing portion (23) having substantially a predetermined passage area, for mixing the fluid jetted from the jet port (17b) and the fluid sucked from the second inlet (22a) is formed at a position downstream of the suction space (22) in a fluid flowing direction, and the opposite side end portion space (21) communicates with the mixing portion (23).

The pressure of the fluid in the mixing portion (23) is far lower than the pressure in the high pressure space (18) but is slightly higher than the pressure in the suction space (22). Therefore, even when the opposite side end portion space (21) in which the fluid jet port and the opposite side end portion (19c) of the needle valve (19) are arranged and the mixing portion (23) are communicated with each other, the pressure difference between both end portions (19b and 19c) of the needle valve (19) can be reduced and the effect described above can be concretely exhibited.

In the present invention, the fluid, as the coolant, may be carbon dioxide ($CO_2$).

The present invention may be more fully understood from the description of preferred embodiments thereof, as set forth below, together with the accompanying drawings.

DESCRIPTION OF THE PREFERRED EMBODIMENTS

First Embodiment

Figure 1:
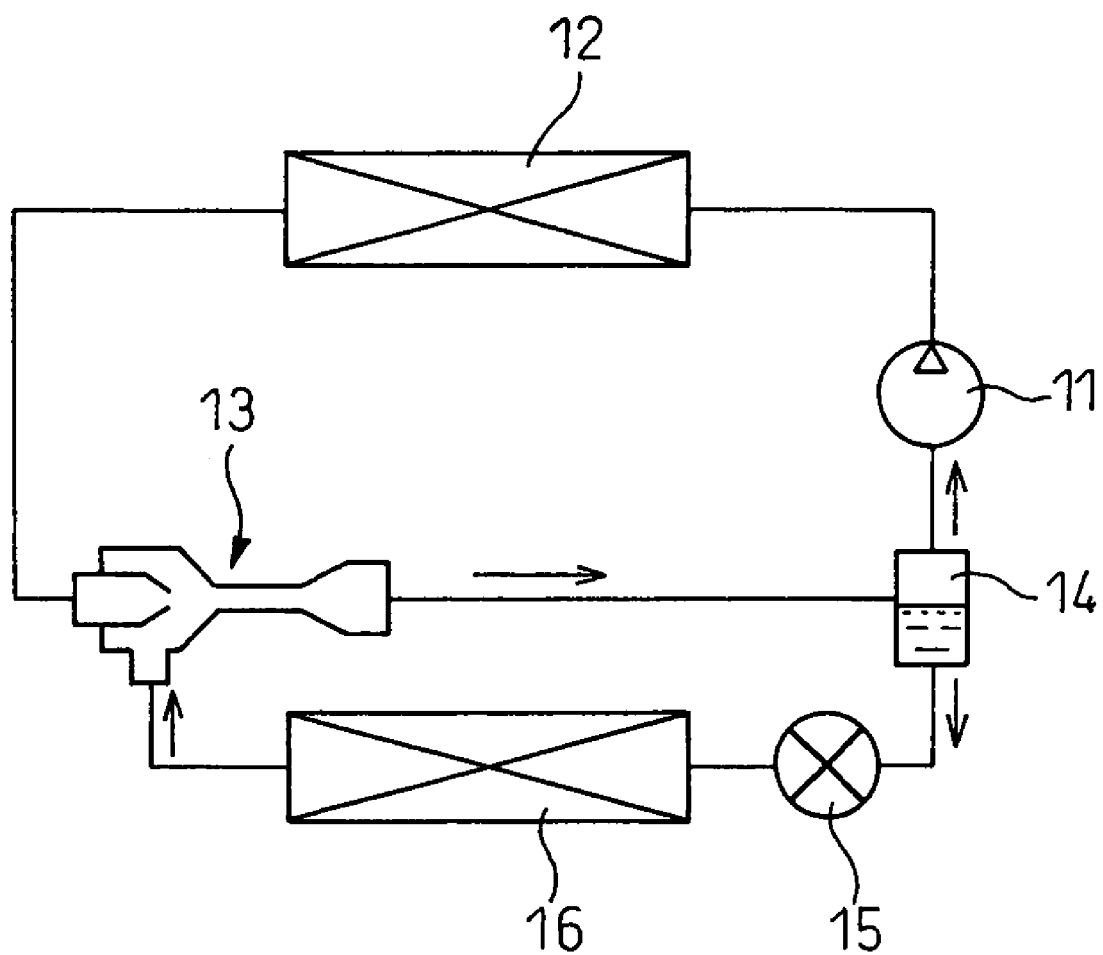
FIG. 1 is a schematic view showing a refrigeration cycle of an air conditioner for a vehicle to which an ejector according to a first embodiment of the present invention is applied.

In this embodiment, an ejector according to the invention is applied to a refrigeration cycle of an air conditioner for a vehicle. FIG. 1 is a schematic view of a refrigeration cycle according to this embodiment. This example uses carbon dioxide ($CO_2$) as a coolant, and this cycle is a supper-critical cycle in which a coolant pressure on the high pressure side exceeds a critical pressure of the coolant. In FIG. 1, reference numeral 11 denotes a compressor for sucking and compressing the coolant. The coolant brought into the high pressure state by this compressor 11 flows into a radiator 12. The coolant inside the radiator 12 radiates heat to external air. In other words, the coolant is cooled by external air.

The coolant so cooled flows into an ejector 13. The ejector 13 reduces the pressure of the coolant flowing out from the radiator 12, expands the coolant, sucks the gaseous phase coolant evaporated by an evaporator to be described later, converts expansion energy to pressure energy and raises a suction pressure of the compressor 11. This ejector 13 will be later described in detail.

The coolant flowing out from the ejector 13 flows into a gas-liquid separator 14. The gas-liquid separator 14 separates the inflowing coolant into a gaseous phase coolant and a liquid phase coolant and stores the coolants. The gaseous phase coolant separated is sucked and is again compressed by the compressor 11 while the liquid phase coolant separated is sucked by the evaporator 16.

The evaporator 16 exhibits its cooling function when the liquid phase coolant exchanges heat with air blown into the room. Incidentally, first pressure reducing means 15 interposed between the gas-liquid separator 14 and the evaporator 16 is a throttle (pressure reducing) means for reducing the pressure of the liquid coolant sucked from the gas-liquid separator 14 towards the evaporator 16 side and reliably reduces the pressure (evaporation pressure) inside the evaporator 16.

Figure 2:
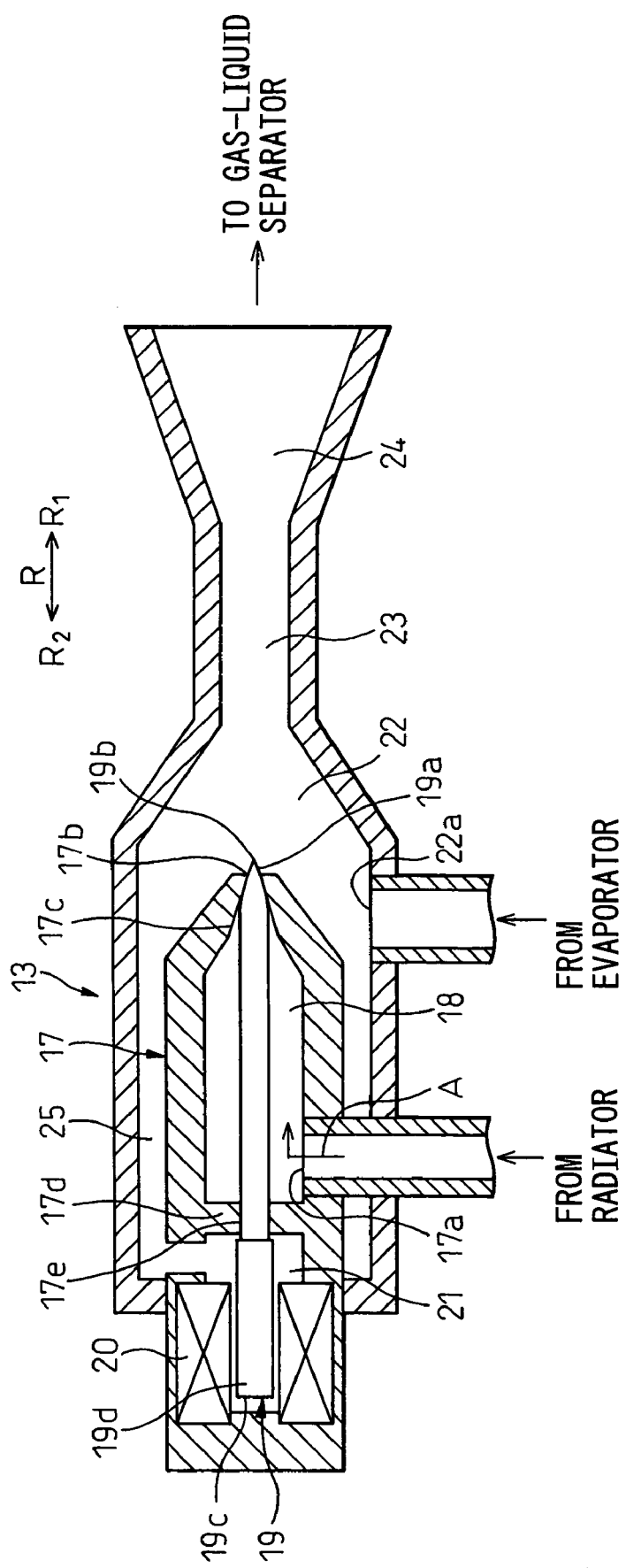
FIG. 2 is a sectional view of the ejector according to the first embodiment of the invention.

Next, the ejector 13 according to the invention will be explained with reference to FIG. 2. The ejector 13 can be broadly divided into a nozzle 17 for mainly reducing the pressure of the coolant, a suction space 22 secured on the downstream side of the nozzle 17 in the coolant flowing direction, for mainly sucking (circulating) the gaseous phase coolant from the evaporator 16, a mixing portion 23 and a diffuser portion 24.

The nozzle 17 has an inlet 17a into which the high pressure coolant after passing through the radiator 12 flows, a high pressure space 18 defined inside the nozzle 17 and a jet port 17b for jetting the coolant from the nozzle 17. A throttle portion 17c having a taper shape the passage area of the high pressure coolant of which decreases from the high pressure space 18 to the jet port 17b is formed between the high pressure space 18 and the jet port 17b.

A needle valve 19 is arranged inside the nozzle 17. When undergoing displacement in an axial direction R of the nozzle 17, the needle valve 19 changes the degree of opening of the throttle portion 17b and regulates the flow rate of the coolant passing through the nozzle 17. The needle valve 19 is substantially a needle like rod member the section of which decreases towards the end portion 19b in the direction R1 on the jet port side in a taper shape 19a. On the other hand, a passive portion (plunger) 19d is formed at the end portion 19c in the opposite direction R2 to the jet port. The passive portion 19d undergoes displacement in the axial direction R when it receives magnetic force generated when a current flows through a coil 20 of a solenoid.

Incidentally, the passive portion 19d and the coil 20 are positioned inside an end space 21 on the opposite side to the jet port 17b and a pressure partition 17d is disposed between the opposite side end portion space 21 and the high pressure space 18. An aperture 17e is bored in the pressure partition 17d and supports the needle valve 19 in such a manner as to be capable of sliding and undergoing displacement in the axial direction R.

The jet port 17b is arranged in the suction space 22 having the gaseous phase coolant inlet 22a into which the gaseous phase coolant evaporated in the evaporator 16 flows. The mixing portion 23 having a predetermined passage section is formed on the downstream side of the suction space 22 in the coolant flowing direction. Furthermore, a diffuser portion 24 is formed on the downstream side of the mixing portion 23 in the coolant flowing direction. The sectional area of this diffuser portion 24 progressively increases towards the downstream direction of the coolant flowing direction. A passage for communicating the suction space 22 and the opposite side end portion space 21 is arranged between them.

Next, the refrigeration cycle and the operation of the ejector 13 will be explained with reference to FIGS. 1 and 2. When the compressor operates, the gaseous coolant is sucked from the gas-liquid separator 14 into the compressor 11 and the compressed coolant is jetted to the radiator 12. The coolant cooled by the radiator 12 flows from the inlet 17a of the nozzle 17 of the ejector 13 into the jet port side space 18a. The coolant thereafter flows towards the jet port 17b (as indicated by arrow A in FIG. 2). At this time, as the throttle portion 17c contracts the passage area and the coolant is subjected to pressure reduction and is expanded. In other words, pressure energy is converted to velocity energy.

The amount of the coolant passing through the throttle portion 17c is regulated because the needle valve 19 undergoes displacement in the axial direction R of the nozzle 17 due to the solenoid 20. When the needle valve 19 undergoes displacement in the jet port direction R1, the taper portion 19a gradually fits to the throttle portion 17c and reduces the passage area of the coolant (decreases the coolant flow rate). When the needle valve 19 undergoes displacement in the opposite direction R2 to the jet port, the taper portion 19a leaves the throttle portion 17c and expands the passage area of the coolant (increases the coolant flow rate).

Incidentally, the jet port of the needle valve 19, the opposite side end portion 19c and the passive portion 19d are positioned in the opposite side end portion space 21 the pressure of which is brought to substantially the same pressure as that of the suction space 22 by the communication passage 25. The magnetic force of the solenoid 20 arranged similarly inside the opposite side end portion space 21 causes displacement of the passive portion 19d, that is, the needle valve 19, in the axial direction R of the nozzle 17.

The coolant passing through the throttle portion 17c is jetted at a high speed from the jet port 17b into the suction space 22. At this time, the coolant turned to the gaseous phase by the evaporator 16 is sucked from the gaseous phase coolant inlet 22a due to the high speed jet stream. The coolant jetted from the jet port 17b and the gaseous phase coolant sucked from the gaseous phase coolant inlet 23 flow to the diffuser portion 22 while they are mixed in the mixing portion 21. The diffuser portion 22 converts the dynamic pressure of the coolant to the static pressure and the coolant returns to the gas-liquid separator 14. As the ejector 13 sucks the coolant inside the evaporator 16, on the other hand, the liquid phase coolant flows from the gas-liquid separator 14 into the evaporator 16 and the inflowing coolant absorbs heat from air blown into the room and evaporates.

Next, the function and effect of the first embodiment will be described. Because the pressure difference between both end portions 19b and 19c of the needle value 19 is set to the small value, the needle valve 19 is allowed to undergo displacement with small force.

Incidentally, it is the high pressure space 18 into which the high pressure coolant flows that has the highest pressure inside the ejector. On the other hand, the coolant has the lowest pressure immediately after it is jetted from the jet port 17b, that is, in the suction space 22. In other words, the pressure difference between both end portions 19b and 19c attains a maximum when one of the end portion 19b of the needle valve 19 on the jet port side and its end portion 19c on the opposite side to the jet port exists inside the high pressure space 18 with the other being positioned in the suction space 22. Incidentally, the end portion 19b of the needle valve 19 on the jet port side is positioned in many cases in the proximity of the jet port 17b or at a downstream portion of the coolant flow, that is, in the suction space 22.

In this embodiment, however, the end portion 19b of the needle valve 19 on the jet port side is positioned in the proximity of the jet port 17b (that is, in the suction space 22) and the end portion 19c on the opposite side to the jet port is positioned in the opposite side end portion space 21. Because the communication passage 25 communicates both of these spaces 21 and 22, the pressure difference between the spaces (that is, between both end portions 19b and 19c) is small.

Consequently, the pressures of both end portions 19b and 19c of the needle valve 19 are made substantially equal to each other and the pressure difference between them is made smaller in comparison with the prior art example where the pressure of one of the end portions 19b and 19c is higher and the pressure difference is great.

Consequently, the drag occurring in the needle valve 19 due to the pressure difference becomes smaller than in the prior art example and the needle valve 19 can be brought into displacement by smaller force. It is thus possible to prevent displacement means such as the solenoid 20 for generating large displacement force from becoming large in size. In addition, delicate displacement adjustment of the needle valve 19 can be made particularly when the amount of the cooling passing through the throttle portion 17c is small.

Incidentally, the present invention is particularly effective in the case of the super-critical cycle using carbon dioxide ($CO_2$), etc, for the coolant. In the super-critical cycle, the pressure difference between the high pressure space 18 and the portion in the proximity of the jet port 17 (suction space 22) sometimes becomes about 10 MPa and displacement of the needle valve 19 becomes difficult in many cases unless the displacement force of the needle valve 19 is great.

Another Embodiment

The first embodiment described above represents the example where the opposite side end portion space 21, in which the jet port of the needle valve 19 and its opposite side end portion 19c are positioned, and the suction space 22 communicate with each other. However, the space with which the opposite side end potion space 21 communicates is not limited to the suction space 22 but may be those in which both end portions 19b and 19c of the needle valve 19 attain substantially the same pressure. For example, the same effect can be acquired when the opposite side end portion space 21 communicates with the mixing portion 23.

The first embodiment given above represents the case where the jet port side end portion 19b of the needle valve 19 is positioned in the proximity of the jet port 17b of the nozzle 17 but the position of the jet port side end portion 19c may be positioned in the suction space 22 or the mixing portion 23. At this time, the pressure difference between both end portions 19b and 19c can, naturally, be made small if the opposite side end portion space 21 communicates with the space in which the jet port side end portion 19c.

Figure 3:
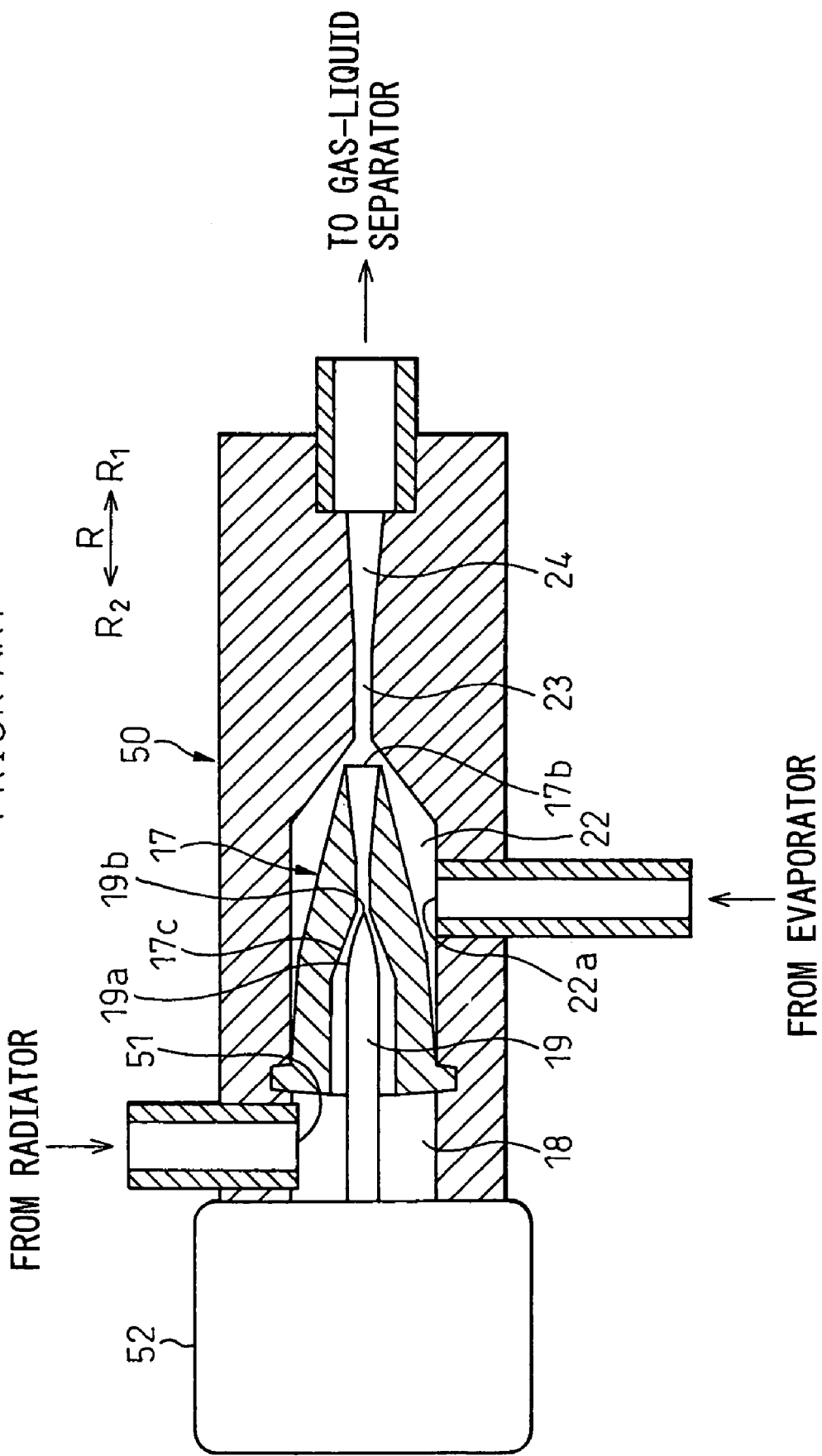
FIG. 3 is a sectional view of an ejector according to the prior art example.
Figure 4:
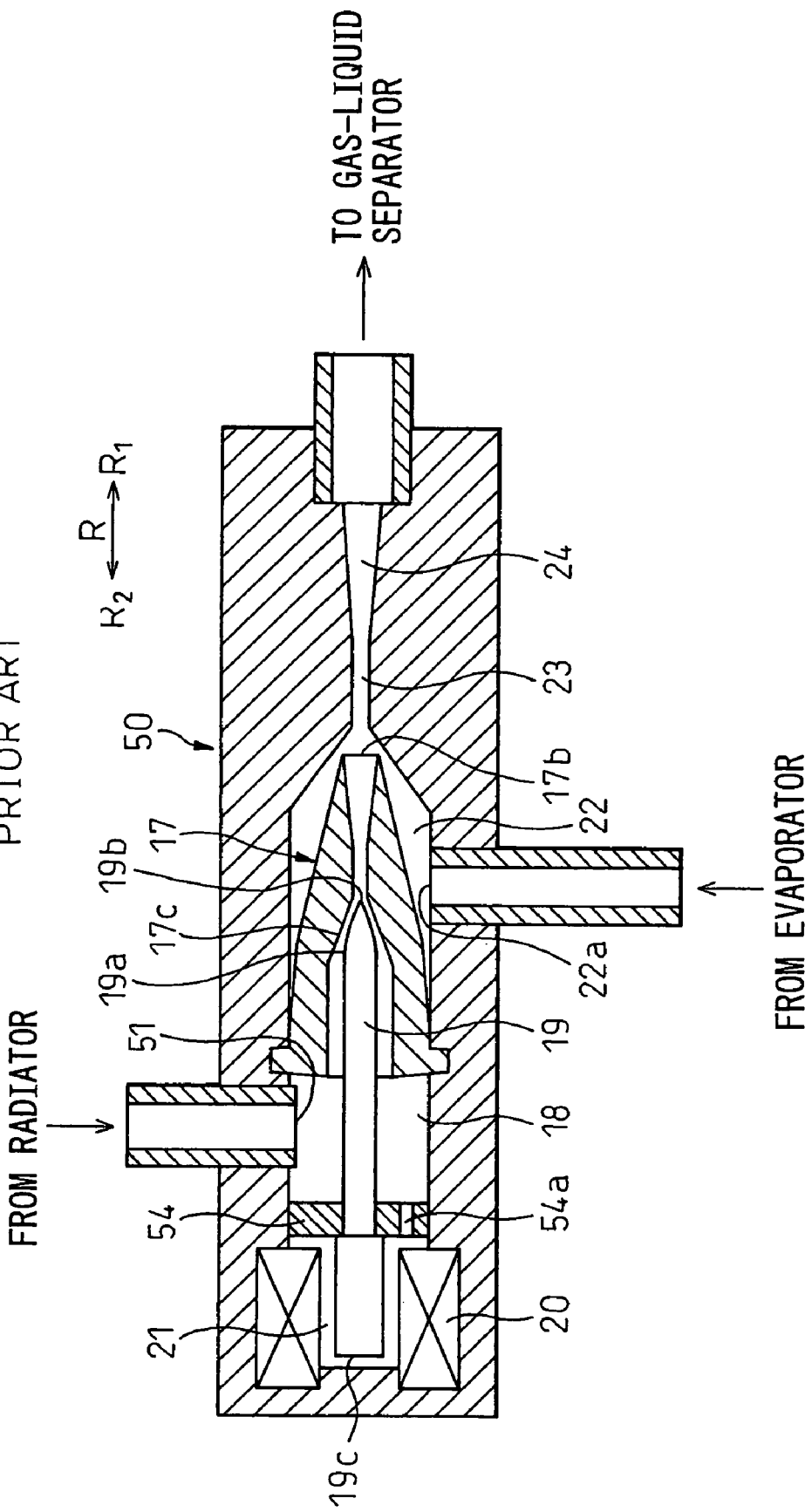
FIG. 4 is a sectional view of an ejector according to a prior art example.

The first embodiment described above represents the example where the high pressure space 18 is formed inside the nozzle 17 but the high pressure space 18 may well be formed inside the main body of the ejector 13 in the same way as in the prior art example shown in FIG. 3. At this time, the inlet may naturally be formed in the main body of the ejector 13 but not in the nozzle 17.

The first embodiment given above represents the example where the needle valve 19 is allowed to undergo displacement by the solenoid. However, the needle valve 19 may well be able to undergo displacement in the axial direction R of the throttle portion 17 and the turning force of a stepping motor, for example, may be converted to linear displacement in the axial direction R.

While the invention has been described by reference to specific embodiments for purposes of illustration, it should be apparent that numerous modifications could be made thereto by those skilled in the art without departing from the basic concept and scope of the invention.

The invention claimed is:

1. An ejector comprising:
a high pressure space into which a high pressure fluid flows from an inlet;
throttle means having a throttle portion for reducing a passage area of said high pressure fluid from said high pressure space towards a fluid jet port;
a needle valve for changing an opening of said throttle portion by undergoing displacement in an axial direction of said throttle portion;
a suction space having a second inlet into which a fluid flows and said jet port arranged therein, and sucking said fluid from said second inlet by an entrainment operation of an operation fluid jetted at a high speed from said fluid jet port;
an opposite side end portion space at which an end portion of said needle valve on an opposite side to said jet port is positioned;
a pressure partition disposed between the opposite side end portion space and the high pressure space; and
a passage which communicates between the opposite side end portion space and a space at which an end portion of said needle valve on a side of said jet port is positioned, for introducing substantially the same pressure as that of the suction space.

2. The ejector according to claim 1, wherein the opposite side end portion space is a different space from said high pressure space, and said opposite side end portion space communicates with said suction space.

3. The ejector according to claim 1, wherein the opposite side end portion space is a different space from said high pressure space, and wherein the ejector further comprises:

a mixing portion having substantially a predetermined passage area, for mixing the fluid jetted from said jet port and the fluid sucked from said second inlet, the mixing portion being formed at a position downstream of said suction space in a fluid flowing direction, and wherein said opposite side end portion space communicates with said mixing portion.

4. The ejector according to claim 1, further comprising: displacement means such as a solenoid or a stepping motor, for causing displacement of said needle valve in the axial direction.

5. The ejector according to claim 1, wherein said fluid is carbon dioxide.

6. An ejector comprising:
a high pressure space into which a high pressure fluid flows from an inlet;
throttle means having a throttle portion for reducing a passage area of said high pressure fluid from said high pressure space towards a fluid jet port;
a needle valve for changing an opening of said throttle portion by undergoing displacement in an axial direction of said throttle portion; and
a suction space having a second inlet into which a fluid flows and said jet port arranged therein, and sucking said fluid from said second inlet by an entrainment operation of an operation fluid jetted at a high speed from said fluid jet port; wherein
an opposite side end portion space at which an end portion of said needle valve on a side of said jet port is positioned and a space at which an end portion of said needle valve on an opposite side to said jet port is positioned communicate with each other; and
the opposite side end portion space is a different space from said high pressure space, and said opposite side end portion space communicates with said suction space.

7. The ejector according to claim 6, further comprising:
a mixing portion having substantially a predetermined passage area, for mixing the fluid jetted from said jet port and the fluid sucked from said second inlet, the mixing portion being formed at a position downstream of said suction space in a fluid flowing direction, wherein said opposite side end portion space communicates with said mixing portion.

8. The ejector according to claim 6, further comprising: displacement means such as a solenoid or a stepping motor, for causing displacement of said needle valve in the axial direction.

9. The ejector according to claim 6, wherein said fluid is carbon dioxide.

10. An ejector applied to a refrigeration cycle, the ejector comprising:
a nozzle having an inlet into which a high pressure refrigerant after passing through a radiator of the refrigerant cycle flows, and defining a high pressure space there inside;
a jet port through which the high pressure refrigerant is jetted;
a throttle portion having a decreasing passage area from the high pressure space to the jet port;
a pressure partition defining an opposite side end portion space at an opposite side to the jet port, the pressure partition being disposed between the high pressure space and the opposite side end portion space;

a needle valve having a first end portion arranged inside the throttle portion to define an opening degree of the throttle portion that is variable in accordance with a displacement of the needle valve in an axial direction, and a second end portion opposite to the first end portion, the needle valve being arranged through an aperture bored on the pressure partition to position the second end portion inside the opposite side end portion space (21); and a suction member defining a suction space in a downstream side of the nozzle in a direction of the refrigerant flowing from the jet port, and an inlet into which a gaseous refrigerant from an evaporator of the refrigerant cycle is sucked; wherein the suction space and the opposite side end portion space communicate via a communicating passage which introduces low pressure refrigerant into the opposite side end portion space lower than that in the high pressure space and reduces a pressure difference acting on the first and second end portions of the needle valve.

11. The ejector according to claim 10, wherein the suction member further defines a mixing portion in a downstream side of the suction space. further defines a mixing portion in a downstream side of the suction space.

12. The ejector according to claim 11, wherein the suction member further defines a diffuser portion in a downstream side of the mixing portion.

13. The ejector according to claim 10, further comprising an electromagnetic member which electromagnetically displaces the needle valve in the axial direction, the electromagnetic member being positioned on the opposite side to the jet port.

14. The ejector according to claim 10, wherein the suction member is a cylindrical member, and the nozzle is a cylindrical member coaxially positioned in the suction member, and the communicating passage includes an axial extending passage defined between the suction member and the nozzle and a radial extending passage between the axial extending passage the opposite side end portion space.

15. The ejector according to claim 14, further comprising an electromagnetic member which electromagnetically displaces the needle valve in the axial direction, the electromagnetic member being positioned on the opposite side to the jet port in a protruding manner from the suction member.

* * * * *